United States Patent [19]
Lin et al.

[11] Patent Number: 5,624,697
[45] Date of Patent: Apr. 29, 1997

[54] INTERMEDIATE STABILIZED COMESTIBLE AND METHOD OF MAKING SAME

[75] Inventors: Wei-Daw A. Lin, Chesterfield, Mo.; Shiowshuh Sheen, Roscoe, Ill.; Vito Vita, Holtsville; John H. Moyer, Garden City, both of N.Y.

[73] Assignee: Kerry Ingredients, Inc., Beloit, Wis.

[21] Appl. No.: 683,215

[22] Filed: Jul. 18, 1996

Related U.S. Application Data

[63] Continuation-in-part of Ser. No. 317,247, Oct. 3, 1994, abandoned.

[51] Int. Cl.$^6$ .................................. A21D 6/00; H05B 6/00
[52] U.S. Cl. ......................... 426/241; 426/94; 426/496
[58] Field of Search .................................. 426/241, 243, 426/523, 496, 94; 219/683

[56] References Cited

U.S. PATENT DOCUMENTS

| | | | |
|---|---|---|---|
| 3,479,188 | 11/1969 | Thelen | 426/241 |
| 4,529,607 | 7/1985 | Lenchin et al. | 426/243 |
| 4,911,939 | 3/1990 | Lou et al. | 426/241 |
| 5,272,299 | 12/1993 | Ovadia | 219/683 |
| 5,290,575 | 3/1994 | Torikata | 426/523 |
| 5,331,135 | 7/1994 | Ovadia | 426/243 |
| 5,334,402 | 8/1994 | Ovadia | 426/243 |

FOREIGN PATENT DOCUMENTS 148563  12/1978  Japan.

OTHER PUBLICATIONS

Corp–Qual–Mkt–Tech News/Trends "Warren Foster Revolutionizes the Doughnuts"—Fortune Jul. 29, 1991.
Corp–Qual–Mkt–Tech, Food Masters Inc. "Manufacturing process of fermentable oil–fried foods".

*Primary Examiner*—George Yeung
*Attorney, Agent, or Firm*—Griffin, Butler, Whisenhunt & Kurtossy

[57] ABSTRACT

A method of making an intermediate stabilized dough shape by heating a proofed dough shape with a combination of convection and microwave heating sufficient to stabilize the dough shape, to form a light skin thereon, to inhibit moisture loss from the interior thereof, and to decrease microbial activity therein. The pastry dough shape has an interior and an exterior, and the light skin is formed on the exterior to provide a moisture barrier and structural integrity sufficient to inhibit moisture loss from the interior and retain the shape during heating, handling, storage and cooking thereof to a finished product.

27 Claims, 5 Drawing Sheets

INTERMEDIATE STABILIZED COMESTIBLE AND METHOD OF MAKING SAME

This is a continuation-in-part application of Ser. No. 08/317,247, filed Oct. 3, 1994 now abandoned.

The present invention relates to an intermediate stabilized dough for subsequently producing a fresh cooked, finished, ready-to-eat comestible and a method of making the dough.

BACKGROUND OF THE DISCLOSURE

Traditionally, leavened bakery products are made by several tedious steps, including ingredient mixing, dough resting, cutting, proofing and, finally, cooking, e.g. frying or baking. As a consequence of the complex process, expensive equipment (such as mixers, proofers, etc.) and highly skilled labor are required. Among the several steps for making leavened bakery products, all but the cooking step require highly skilled labor.

Because of a shortage of skilled labor, small bakeries, e.g. in-store bakeries, and franchised bakery shops, such as donut shops, face not only high labor costs, but also the problem of inconsistency of the quality of their products. Experience has demonstrated that reliable skilled labor is the key to a successful small bakery business.

Obviously, it would be desirable to provide an intermediate stabilized dough which eliminates the need in the small bakery for both the expensive equipment and the skilled labor. In theory, such an intermediate stabilized dough could be manufactured in a large centralized location, with the intermediate stabilized dough being cut, proofed and thermally stabilized, but not finished cooked. This intermediate stabilized dough, either at ambient, refrigerated or frozen conditions, could be transported to a small bakery where it is finished cooked just before retailing or serving.

For example, in the case of a donut, the last step in making a fresh-fried pastry donut is that of the small bakery shop frying the intermediate stabilized dough, followed, optionally, by icing, glazing or sugaring thereof. Thus, the only equipment required for finished cooking is an inexpensive fryer, which can be operated by relatively unskilled labor. Hence, by using such an intermediate stabilized dough, small retail shops would be able to provide customers with fresh-fried pastry donuts or similar fried leavened products, while at the same time reducing expensive skilled labor and equipment. Most importantly, also such use of an intermediate stabilized dough would standardize the qualities of products, especially in franchised bakery shops. Such intermediate stabilized dough could also be used by supermarket in-store bakery units, warehouse baking clubs, as well as retail outlets of all types.

Despite the obvious advantages of such intermediate stabilized products, the use of intermediate stabilized products has not been adopted to any significant extent and, even when adopted, the use is associated with the concept of low-cost/low-quality products. This is the result of the inferior organoleptic qualities of the finished products.

In this regard, such intermediate products have generally taken the form of precooked products, instead of intermediate doughs, and the finished products are produced by simply reheating the precooked products, e.g. by heating in a microwave oven or a conventional conduction oven (no positive convection means) or a conventional convection oven or combination thereof. During conduction or convection heating, the temperature gradient from the surface or exterior to the center or interior of the product is great. Therefore, the exterior surface of the product dries out due to excessive exposure to dry heat during the time required for the center of the product to be heated. The result is a thick and tough skin formed on the exterior of the product so that the resulting product has a chewy and dry texture. The difference between an undesirable relatively thick and tough skin and a desirable light skin is not determined by skin "thickness" in the literal sense, but rather organoleptically.

On the other hand, if the heating is by way of a microwave oven, the product becomes dry and chewy because the water molecules within the interior of the product are excited by the microwave energy and diffuse outwardly from the interior through the exterior of the product, thereby leaving a dry and chewy product.

Accordingly, prior attempts at providing an intermediate stabilized product for finished heating at the small bakery shop have not been satisfactory. The fundamental reason for this unsatisfactory result is that many bakery products require that a dough be finished cooked (not reheating a finished cooked product) in order to provide the traditional fresh taste of the ready-to-eat finished product. Therefore, if a fresh taste is to be provided, the product to be finished cooked before serving must be a dough; it cannot be a finished cooked product which is simply warmed by reheating, since the fresh flavor will have deteriorated during storage and handling of that cooked finished product.

However, preparing an intermediate dough product has engendered considerable difficulties in the art, and this is especially true when the dough is a leavened dough. For example, if the dough is leavened with yeast, and the dough is not cooked to a finished product, then the yeast activity will continue, and the dough will continue to leaven. Therefore, if the dough is formed into a particular predetermined finished product shape, e.g. a donut shape, the leavening will continue to raise the dough and that donut shape will be destroyed. Thus, absent some other provisions, forming the dough into the correct predetermined shape, e.g. a donut, but without the usual finished cooking, that shape will be destroyed and the product ruined.

Another difficulty in this regard is that most finished products have a desired predetermined moisture content. For example, in a donut, the moisture content of the cooked donut, on a ready-to-serve basis, should be somewhere in the range of the upper 20's to about 30%. If the moisture content is significantly above this range, then the donut will have a soggy taste, which is most unacceptable. On the other hand, if the moisture content is significantly below this range, then the donut has a somewhat tough texture and a dry taste and mouth feel.

Any dough product will contain water, and if that dough product is allowed to remain uncooked, moisture will transfer from the dough to the surrounding atmosphere and dry that dough to a lower moisture content. When that lower moisture content dough is then cooked to the finished product, that finished product will have less than the desirable moisture content. On the other hand, if the dough is stored in humid conditions to avoid such moisture loss, the dough can pick up additional moisture, and when cooked to the finished product, will have a soggy taste. Moisture loss can be partially controlled by packaging the dough in plastic wraps, but the loss is not entirely avoided and is considerably variable. Beyond that, the plastic wraps are difficult to remove. Even if plastic wraps were satisfactory, the problem of continued leavening of the yeast-leavened dough and loss of the desired shape, e.g. a donut shape, would not be avoided.

Further, even if the dough could be stabilized to avoid that loss of shape and moisture, this would be of very little significance if substantial microbial activity takes place in the dough after such stabilization but before cooking and consuming.

SUMMARY OF THE INVENTION

The present invention is based on several primary discoveries and several subsidiary discoveries. As a primary discovery, it was found that an intermediate, leavened, farinaceous, comestible, stabilized dough could be prepared by heating a desired dough shape with a combination of convection and microwave heating sufficient to stabilize the dough shape such that subsequent cooking to a finished product does not substantially change the stabilized dough shape.

As a further primary discovery, it was found that the combination of convection and microwave heating can also be sufficient both to decrease the microbial activity of the dough such that any yeast present in the dough is deactivated and to stabilize the dough such that the dough has a room temperature shelf-life greater than that of a corresponding but unstabilized dough.

As a third primary discovery, it was found that such combination of convection and microwave heating can also be sufficient to form a substantially continuous exterior surface skin over substantially the entire surface of the dough shape. That surface skin has gelatinized starch and denatured protein sufficient to provide a moisture barrier and structural integrity sufficient to retain the moisture and dough shape during heating, handling and storage of the stabilized dough shape and such that the subsequently cooked finished product has a moisture content and shape substantially equal to the predetermined moisture content and shape of the desired comestible.

As a subsidiary discovery, it was found that the heating may be one of simultaneous convection and microwave heating, or convection heating followed by microwave heating, or convection heating followed by a combination of convection and microwave heating.

As a further subsidiary discovery, as one embodiment, it was found that the convection heating is at a temperature of from about 320° F. (160° C.) to about 400° F. (204° C.), but preferably is at a temperature of about 330° F. (166° C.) to about 395° F. (201° C.) and that the microwave heating preferably is at power settings of about 31 to 82 watts per ounce (per 28 grams) of dough, when the total heating time is up to about 3 minutes. On the other hand, as another embodiment, it was found that the convection heating may be at those same temperatures, but at power settings of about 82 to 111 watts per ounce (per 28 grams) of dough, when the total heating time is up to about 2.5 minutes.

As another primary discovery, it was found that such a stabilized dough will have a stabilized interior portion such that subsequent cooking to the finished product does not substantially change the predetermined shape of the dough and a decreased microbial activity of the dough is such that any yeast present in the dough is substantially deactivated and the stabilized dough has a room temperature shelf-life greater than that of a corresponding but unstabilized dough.

Thus, briefly stated, the present invention provides a method for making an intermediate, leavened, farinaceous, comestible, stabilized dough having a predetermined shape, which after handling and storage is suitable for subsequent cooking to a ready-to-eat cooked finished product having a predetermined moisture content and shape.

The method comprises forming dough into a predetermined finished dough shape and heating the dough shape with a combination of convection and microwave heating sufficient to:

(a) stabilize the dough shape such that subsequent cooking to the finished product does not substantially change the stabilized dough shape;

(b) decrease the microbial activity of the dough such that any yeast present in the dough is deactivated and the stabilized dough has a room temperature shelf-life greater than that of a corresponding but unstabilized dough; and (c) form a substantially continuous exterior surface skin over substantially the entire surface of the stabilized dough shape, said surface skin having gelatinized starch and denatured protein to provide a moisture barrier and structural integrity sufficient to retain moisture and the dough shape during the heating, handling and storage of the stabilized dough shape that the subsequently cooked finished product has a moisture content and shape substantially equal to the predetermined moisture content and shape.

There is also provided an intermediate, leavened, farinaceous, comestible, stabilized dough having a predetermined shape, which after handling and storage is suitable for subsequent cooking to a ready-to-eat finished product having a predetermined moisture content and shape. The product comprises:

(A) an interior portion having:
   (1) a stabilized dough such that the subsequent cooking to the finished product does not substantially change said predetermined shape; and
   (2) a decreased microbial activity of the dough such that any yeast present in the dough is substantially deactivated and the stabilized dough has a room temperature shelf-life greater than that of a corresponding but unstabilized dough; and (B) a substantially continuous exterior surface skin over substantially the entire surface of the stabilized dough, said surface skin having sufficient gelatinized starch and denatured protein to provide a moisture barrier and a structural integrity sufficient to retain moisture and the dough shape during the heating, handling and storage of the stabilized dough shape that the subsequently cooked finished product has a moisture content and shape substantially equal to the predetermined moisture content and shape.

DETAILED DESCRIPTION OF THE PREFERRED EMBODIMENTS

For conciseness herein, the principles of the present invention are primarily discussed in regard to pastry donuts, but it will be readily appreciated that the same principles are applicable to a wide variety of bakery products. Also, the specific examples to illustrate the principles, e.g. pastry donuts, are also equally applicable to other like pastries, such as glazed rings, cinnamon buns, long johns, jelly pastry donuts, and the like. Indeed, the principles are equally applicable to any other comestibles in the form of an individual free-standing, farinaceous product, whether fried or baked and whether yeast leavened or chemically leavened, e.g. pastries, dinner rolls, hamburger buns, biscuits, cakes, donuts, etc.

Farinaceous products are those including a substantial proportion (at least 33% by weight) of a cereal flour, e.g. wheat, barley, oats or corn meal. Free-standing products are those which are either loose (not conformed to the shape of a container) or in a container which does not shape the product (except for the bottom portion thereof).

In its conventional aspects, the method of making the present intermediate stabilized dough involves the conventional steps of mixing the conventional dough ingredients and allowing the mixed dough to rest to produce an intermediate dough. Thereafter, the intermediate dough is formed, e.g. cut, molded, extruded, stamped, etc., to a dough shape, e.g. donut shape, roll shape, biscuit shape, etc., and proofed. As each of these steps are conventional steps using conventional ingredients for the manufacture of a dough shape, further details thereon need not be provided herein, but will be readily apparent to those skilled in the art.

Turning now to the novel aspects of the present invention, the formed and proofed dough shape is then heated with a combination of convection and microwave heating sufficient, among others, to form a light skin thereon to inhibit moisture loss from the interior thereof. The heating is preferably continued for a total time according to one of two combination heating cycles: a low microwave power cycle and a medium microwave power cycle. These two cycles will be satisfactory for most dough shapes, but for special doughs, other conditions may be more appropriate.

According to the low power cycle, the formed and proofed dough shape is heated simultaneously by low air velocity convection heating and low power microwave heating for the total heating time. Thus, the dough shape may be heated in a combination convection and microwave oven for simultaneous heating by convection and low power microwave energy for the total heating time. Preferably, the low air velocity convection heating is at a temperature of about 220° F. (104° C.) to about 400° F. (204° C.), but preferably at about 330° F. (166° C.) to about 395° F. (201° C.) (optimally 345°–375° F.–174°–191° C.) and with air velocities of about 25 to 200 feet per minute (7.6 to 61.0 meters per minute) (optimally 50–150 feet per minute—15.3 to 45.7 meters per minute). The low power microwave heating is at a power setting of about 31 to 82 watts per ounce (per 28 grams) of dough (optimally about 35–75 watts, e.g. 73 watts, per ounce—per 28 grams), and the total heating time is up to about 3 minutes, e.g. 2.5 to 3 minutes.

The medium power cycle uses, generally, sequential convection and microwave heating. Convection heating is used for at least an initial period of the total heating time and medium power microwave heating is used for a terminal period for the total heating time. Preferably, the convection heating is at the same temperatures and air velocities noted above, but with a microwave power setting of about 82 to 111 watts per ounce (per 28 grams) of dough (optimally about 90–110 watts, e.g. about 96 watts, per ounce—per 28 grams). While the total heating time may be up to about 3.0 minutes, e.g. 2.5 to 3.0 minutes, preferably, the total heating time is up to about 2.5 minutes. However, for some doughs the initial period of the total heating time is about 2.5 minutes, and the terminal period of the total heating time is about 0.5 minute. Generally, convection heat is used during the initial period and microwave heating is used during the terminal period, but the convection and microwave heating periods may overlap with total heating times up to about 2.5 minutes. If they do not overlap, the total convection heating period is preferably about 2.5 minutes, followed by the total microwave heating period of about 0.5 minute. If the two periods completely overlap, the total heating period is up to about 2.5 minutes. If the periods only partially overlap, convection heating may continue throughout both the initial period (up to about 2.5 minutes) and the following terminal microwave period (up to about 0.5 minute).

The above power settings and times used in the specification and claims are based on microwaves generated at a frequency of about 2450 megahertz, and on a usual efficiency of power distribution within the microwave oven, e.g. a Cober Model S6F. However, those skilled in the art know that the power and heating efficiency of a microwave oven vary with the frequency, age of the magnetron, design of the magnetron and oven, and microwave distribution devices. Thus, for a particular frequency, e.g. 915 megahertz European standard, and particular oven, those power settings and times may require adjustments and conversions to compensate for the particular frequency and oven. Those skilled in the art are quite capable of making such adjustments and conversions, and no further explanation thereof is required. The claims are intended to apply to such adjustments and conversions.

The continuation of the convection heating during the terminal microwave period has only a minor effect on the stabilized dough. Whether or not the convection heating is continued during the terminal period will frequently depend upon the equipment used to effect the process of the present invention. Where the microwave heating is conducted within the same oven as the convection heating, the convection heating may continue through the microwave heating period, since it is more convenient to continue the convection heating. On the other hand, where the dough shape is first heated in a convection-heating-only oven and then transported into a microwave heating oven, then the convection heating will not continue through the microwave terminal period.

Unlike microwave heating only or convection heating only, the combination of the two heating methods not only lessens the processing time, but maintains the moisture inside of the intermediate stabilized dough shape. Indeed, the intermediate stabilized dough shape according to the present invention and traditional yeast-raised dough shapes (not subjected to the present convection and microwave heating) have essentially the same moisture content after cooking to a finished ready-to-eat product. The volume, configuration and cell (crumb) structure of the dough shape are set after the dough shape is treated by the combination of the two heating methods, and the further cooking to the finished product does not substantially change the same. The intermediate stabilized dough shape has a uniform dough-cream color and a slight surface skin. The cooked product has the characteristic volume, configuration, shape and cell structure of traditional prepared products.

After cooling, preferably, the intermediate stabilized dough shapes are packaged in a modified atmosphere, e.g. $CO_2$ and $N_2$ or $CO_2$ alone (i.e. modified atmosphere packaging or MAP) or frozen and packaged to prevent recontamination by microorganisms.

The only procedure left to the individual small bakery, e.g. a retail pastry donut or bakery shop, for preparing the finished ready-to-eat product is cooking the dough shapes, e.g. baking, frying and boiling (frying in the case of donuts), along with any optional decorating (sugaring, glazing, icing or filling) before the ready-to-eat products are served or sold to customers. For example, in the case of donuts, after frying, the characteristics of the finished products made from the intermediate stabilized dough shapes are substantially the same in shape, spread, crown, white line, cell structure, crust, taste, mouth feel and moisture content as conventional prepared and fried yeast-raised pastry donuts. In this regard, substantially as used herein means that a usual (non-expert) consumer is unlikely to notice any differences. It will also be appreciated by those skilled in the art that the cooking, e.g. frying, of the stabilized intermediate dough shape reverses any staling of the dough shape which might have occurred during prolonged storage or handling so that the customer receives a "fresh" tasting product.

Thus, the present invention not only provides small bakeries, e.g. individual retail donut or bakery shops, an opportunity to serve their customers fresh products, but eliminates expensive equipment and skilled labor requirements for the shops. The present invention further standardizes the quality of such products for franchised bakery shops or the like and provides an opportunity for other outlets to offer popular fresh products without expensive equipment and skilled labor. The intermediate stabilized dough shapes, and particularly one embodiment of the present invention (using MAP), do not require refrigeration to preserve the products, do not occupy the valuable and costly refrigeration space of the retail shop and thereby reduce the energy costs of the retail shop accordingly.

The surprising and unexpected results obtained according to the present invention by combining the two different heating methods is believed to result from the following phenomena. During the convection heating, a light continuous exterior surface skin is formed on the exterior of the dough shape. The starch and protein located on the surface of the dough shape are partially gelatinized and denatured, respectively, when the dough shape is exposed to hot moving air during convection heating. These changes in the starch and protein, combined with relatively rapid moisture loss from the exterior surface due to heating with the moving air, result in the formation of the light skin, probably by coagulation. The continuing formation of the light skin progressively acts as a moisture barrier to progressively decrease the escape of moisture from the interior to the exterior of the dough shape and subsequently to the atmosphere. Stated another way, the diffusion rate of moisture from the dough shape interior to the ambient surroundings is progressively decreased to a condition such that undue moisture loss from the interior of the dough shape during microwave heating is avoided.

It has been found that, in the low power cycle (simultaneous convection and microwave heating of the dough shape), the period of time required for the low power microwave energy to excite water molecules within the dough interior and the period of time required for the excited water molecules to diffuse outwardly to the dough shape exterior, in combination, exceed the period of time required for the convection heating to develop a sufficient light skin on the dough shape exterior. Thus, the effect of the skin is that of inhibition of moisture loss. Accordingly, even though both the microwave and convection heating commence at the same time with the low power cycle, the convection heating achieves its desired effect, i.e. formation of the thin skin, before the deleterious effects, i.e. excessive moisture loss, of the microwave heating arise. On the other hand, since the heating of the dough shape interior proceeds relatively rapidly even with the low power microwave cycle, the present convection heating period is less than a heating period which would be required if convection heating were used alone. Therefore, with the present invention, the convection heating period need not extend for a time such that the dough shape interior is dried out or an undesired thick tough skin forms on the dough shape exterior.

It has also been found that, in the medium power heating cycle (using convection heating for at least an initial period and medium power microwave heating for the terminal period), the convection heating in the initial period is sufficient to achieve the desired sufficient skin on the exterior of the dough shape such as to inhibit significant moisture loss during the higher power of the subsequent microwave heating. This is an important feature since the power of the medium microwave cycle will excite the molecules of water in the dough shape interior and cause the excited water molecules to diffuse outwardly to the exterior thereof at a much greater rate than does the low power microwave heating of the low power cycle.

Additionally, the pressure tending to move the excited water molecules out of the dough shape may be higher in the case of medium power microwave heating than in the case of low power microwave heating. Accordingly, in the medium power cycle, it is also important that the light skin be formed on the exterior of the dough shape sufficiently to resist those pressures before the microwave heating effects arise. As in the case of the low power cycle and as explained above, the microwave heating of the medium power cycle decreases the amount of time required as compared with the time required if the dough shape were subjected to convection heat alone. Convection heating alone would extend the period of time sufficient to stabilize the dough that during that period the dough would dry out and form an undesired thick tough skin on the exterior thereof.

The light skin has a further function in regard to both the low power and medium power microwave heating. As can be easily appreciated, during such heating, the excited water molecules increasingly generate increasing internal pressures within the dough shape. While these pressures are not great, without more, the pressures will eventually be sufficient to cause distortion of the dough shape, and, hence, ruining the product. However, with the present method, the forming light skin resists such distortion, while at the same time allows some escape of moisture and, hence, control of pressure. As the light skin further forms, this resistance to distortion increases. Thus, the light skin is also significant in that it provides a structural integrity sufficient to retain the dough shape during further heating (either in completing the stabilization heating or heating to cook to a finished product), handling and storage that a subsequently cooked finished product has a shape substantially equal to the predetermined shape, e.g. the shape of a donut.

As can be appreciated from the foregoing, it is only the combination of the convection heating and microwave heating that will provide the present novel stabilized dough. Convection heating alone or microwave heating alone will not provide the present stabilized dough. Further, the combination of these two heatings must be such to achieve the light skin, stabilized shape and decreased microbial activity.

Thus, the present invention solves the problems of the above-noted prior art in connection with dough having a predetermined shape and suitable for subsequent cooking to a ready-to-eat finished product with a predetermined moisture content and shape, by forming the dough into a leavened, predetermined, dough shape and then heating that dough shape with a combination of convection and microwave heating. However, as is clear from the above, that combination of convection and microwave heating must be sufficient to stabilize the dough shape, e.g. by forming the light skin and by stabilizing the "crumb" or "cell" structure of the dough, such that the subsequent cooking of the dough to the ready-to-eat finished product does not substantially change the predetermined shape. Stated another way, that combination of heating is sufficient to stabilize the dough shape, e.g. form the light skin and stabilize the crumb or cell structure, such that the shape-sustaining stabilized dough may be cooked to a finished product while substantially retaining that shape.

Also, that combination of convection and microwave heating must also be sufficient to decrease the microbial activity of the dough such that, at least, any yeast present in the dough is deactivated. This will avoid loss of shape of the dough by additional rising of the dough during storage and cooking thereof. In addition, deactivation of microbial activity will increase the room temperature shelf-life of the stabilized dough, as compared to the room temperature shelf-life of a corresponding dough but which has not been stabilized. This also avoids the necessity of cooling the present dough with refrigeration during storage, which not only frees valuable refrigeration storage space, but allows the cooking of the dough from a room temperature thereof, as opposed to a refrigerated temperature thereof.

Further, the combined convection and microwave heating must form the substantially continuous exterior surface skin over the dough with sufficient gelatinized starch and denatured protein to provide a moisture barrier and structural integrity sufficient to retain the moisture during stabilization, handling and storage to the extent that the subsequently-cooked finished product has a moisture content and shape substantially equal to that desired predetermined moisture content and shape of the finished product.

Accordingly, important features of the invention are that of providing a stabilized dough (not a cooked finished product) which can be subsequently cooked to a ready-to-eat finished product of a predetermined moisture content and shape by forming the dough into a predetermined shape and heating with combinations of convection and microwave heating. The dough has an interior portion which is so stabilized that subsequent cooking of the dough shape to the finished product does not substantially change the predetermined shape of the stabilized dough, i.e. the shape of the stabilized dough and the shape of the finished product are substantially the same. The dough has decreased microbial activity such that any yeast present in the dough is deactivated and the room temperature shelf-life is extended, as noted above. The dough has a substantially continuous exterior surface skin over substantially the entire surface of the dough, and the surface skin has sufficient gelatinized starch and denatured protein to provide a moisture barrier and structural integrity sufficient to retain moisture and the shape during stabilization, handling and storage such that the subsequently-cooked finished product has a moisture content and shape substantially equal to that desired predetermined moisture content of the finished product.

The predetermined dough shape can be any desired dough shape consistent with the shape of the intended ready-to-eat finished product, e.g. in the shape of a bead, cake, biscuit, roll, loaf, bun, dessert cup, donut and the like, as well as special designs such as those appropriate for decorative breads and the like. However, any chosen shape must also be consistent with allowing the light skin to form. A shape which will substantially negate the skin-forming effects of the convection heating should be avoided. These undesired shapes will depend on the particular convection oven, the air velocity and directions thereof, as well as the temperature produced by the oven. However, generally speaking, the shape should not include significant blind passages (with no outlet), since such blind passages will prevent the moving air of the convection oven from sufficiently flowing over the exterior of such blind passages to form the required light skin, as explained above. Small, or a small number of, blind passages which have insufficient skin can be tolerated, since the moisture loss through that insufficient skin may still be within acceptable limits.

In this latter regard, a sufficient skin is not susceptible to a numerical definition, since a sufficient skin will depend on a number of factors. These factors include the ratio of surface area to volume of the dough shape, the particular dough mix (which can affect the gelatinization of starch and the denaturing of protein, as well as the moisture content and loss), the conditions of and intended time of storage of the dough shape, the times, temperatures and combinations of convection and microwave heating, and the mode and conditions of the cooking of the dough shape to the finished ready-to-eat product. For example, moisture loss during convection/microwave heating, storage and cooking to the finished product will depend on the ratio of surface area to volume of the dough shape. A spherical shape will, of course, have a much lower surface area-to-volume ratio than a thin flat shape, and, accordingly, a surface skin which may be sufficient for a spherical shape may not be sufficient for a thin flat shape. Likewise, dough shapes stored in a modified atmosphere package (MAP) will lose less moisture than ambient stored dough shapes. Hence, a surface skin which is sufficient for MAP storage may not be sufficient for ambient storage.

However, the sufficiency of the skin for any intended shape and storage is easily determined experimentally. As noted above, the surface skin is to be sufficient to retain moisture to the predetermined desired content and provide structural integrity during all of heating, handling, storage and cooking, such that the subsequently cooked finished product has a moisture content and shape substantially equal to a predetermined moisture content and shape, i.e. the moisture content of the traditionally prepared corresponding product, e.g. donut. Thus, simply by arranging that the surface skin retains the moisture and shape of the dough shape at the predetermined moisture content (moisture range) and shape during all intended processing, handling, storage and cooking thereof so as to have that predetermined moisture content and shape after cooking, the surface skin is, therefore, sufficient. The so arranging of the surface skin for any particular dough shape is achieved by simply adjusting the conditions of the convection heating/microwave heating and, optionally, storage condition. The specific conditions recited above for the low power cycle and the medium power cycle are correct for achieving a sufficient skin for a donut shape of traditional donut dough. However, since donut dough is similar to many other doughs, and the donut shape has a surface area-to-volume ratio at least as high as most common dough shapes, those conditions will also be satisfactory to form a sufficient skin for most doughs, dough shapes, heating conditions, storage and cooking conditions.

Nevertheless, if a particular dough or dough shape or storage or cooking or a combination thereof, ultimately, provides a moisture content outside of the desired predetermined moisture content range or a distorted shape, then the conditions of convection heating/microwave heating may be appropriately adjusted. For example, if the ultimate (cooked) moisture content is low or high, then the temperature and/or time of the convection and/or microwave heating or both can be adjusted. If the moisture content is high, then, for example, the convection heating temperature can be increased, e.g. up to about 420° F. (216° C.). Alternately, the time of the convection heating can be increased, e.g. for up to about 5 minutes. On the other hand, if the moisture content is low, then the temperature of the convection heating or the time thereof or both can be decreased, e.g. to as low as about 280° F. (138° C.) and for as little as about 1 minute. Alternatively or in combination, the microwave heating can be adjusted, e.g. from as little as about 10 watts per ounce (per 28 grams) of dough up to as high as about 150 watts per ounce (per 28 grams) of dough and at times for as little as about 10 seconds up to about 2 minutes. Normally, however, these extreme ranges will not be necessary to achieve a sufficient skin, and the lower power cycle or medium power cycle will be satisfactory. Also, as noted above, the microwave conditions are based on a conventional microwave operating at a frequency of about 2400 megahertz. Frequencies outside of this range will require consistent adjustments and conversions of power and time.

As an approximately of a sufficient skin, but not as accurate as the above-described procedure, the moisture loss (weight decrease) of a dough shape maintained in an atmosphere of 50% relative humidity and at 68° F. (20° C.) with time is determined. The skin is likely to be sufficient if the weight loss is no more than 10% within 5 days.

Further, the conditions may be adjusted to accommodate different flours used in formulating the dough shape. Usual flours are: "Patent flour" (also known as bread flour); high gluten flour, e.g. used to produce bagels; cake flour (a soft wheat flour) used for less elastic products, e.g. donuts, cakes, etc.; semolina flour (Durham flour), e.g. used to produce pasta; club flour (a soft wheat flour) similar to cake flour; and all purpose flour, used for a wide variety of products. Each of these flours may require some adjustments in conditions in view of the known different cooking (baking, frying, etc.) properties, but those skilled in the art are well aware of these differences and can easily make such adjustments. However, as a general rule, most flours set at temperatures of about 200° F. (93° C.) and higher, and if the conditions are adjusted so as to produce a minimum of 200° F. (93° C.) within the dough shape, this will normally be satisfactory for any flour.

However, for particular flours, setting can easily be determined by one skilled in the art and the degree of setting can vary somewhat depending on the particular desired finished product and the criticality of the shape thereof. Hence, for some products, setting temperatures as low as 160° F. (71° C.) may be used, but more usually setting temperatures should be at least 175° F. (79° C.) and more preferably at least 190° F. (88° C.).

It should be noted that any such adjustments, as discussed above, must also be consistent with the microwave heating (partially in combination with the convection heating) being sufficient to decrease the microbial activity and stabilize the dough shape, as discussed above. Such adjustments cannot be to an extreme where such decrease in microbial activity and stabilization of the dough shape is not achieved.

EXAMPLES

The following examples illustrate the present invention in regard to yeast leavened products, e.g. pastry donuts and like conventionally fried pastries (Examples 1–4), baked (non-fried) yeast-leavened products, such as dinner rolls and hamburger buns (Examples 5 and 7), chemically-leavened products, such as biscuits (Example 6) or fried cake donuts (Example 8).

Oven Calibration

The microwave oven used in all of the examples described hereinbelow was a Cober Electronic Company LBM 12A microwave oven. In order to provide the power level required for any given size and type of product, a Percentage of Power meter on the oven is adjusted to obtain the power level desired. Theoretically, for example, if the calibration is linear and if the magnetron is a 1.2 kilowatt, 600 watts is obtained from a 50% power setting.

However, the actual power delivered by a magnetron, i.e. the performance of a microwave generator, deteriorates as a function of life span. In other words, a 5-year old, 800 watt microwave oven will not now be able to deliver the same amount of power as it did five years ago. To calibrate the oven, 2000 grams of cold liquid water was heated in the oven for a certain time and the temperature difference over that time was measured. With the specific heat of water, the total energy absorbed is calculated and converted to wattage. In order to reduce the energy loss through evaporation, the heated water temperature was kept below 122° F. (50° C.). Still, there exist some other factors which can affect the oven power measurement, e.g. the oven design or specimen design. Therefore, oven output calibration (using consistent procedures) is necessary, especially when an energy/unit weight comparison is required.

The Cober LBM 1.2A oven can differentiate 1200 watts output into 100 parts with 12 watts increase per setting increment. As a non-linear relationship between power output and control setting may be expected, a calibration curve can provide useful output data at any setting point through interpolation. The generalized procedure for microwave oven calibration follows. It should be noted that different values (watts per ounce) may be obtained if the calibration method is changed.

Figure 1:
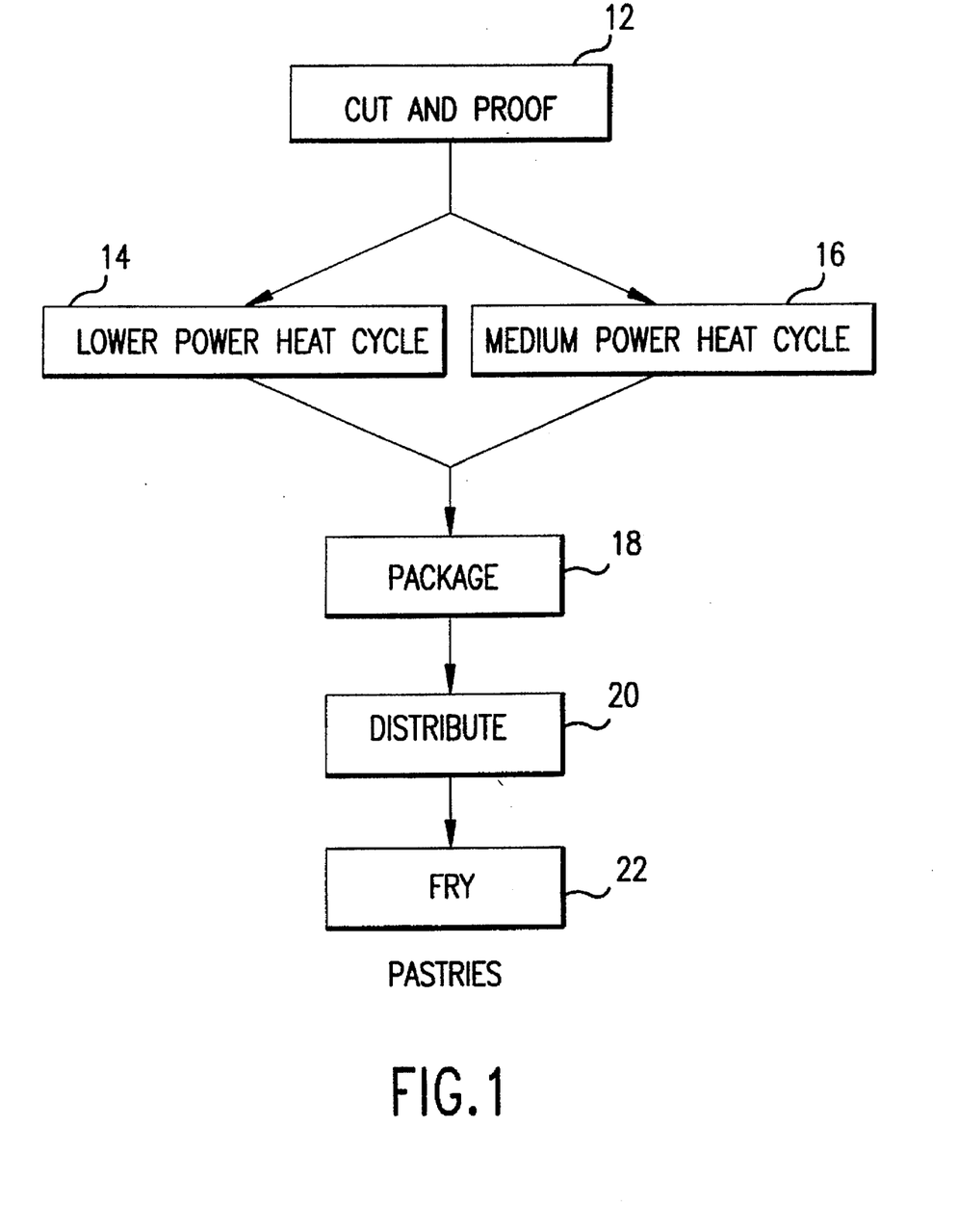
FIG. 1 is a flowchart of the method of the present invention for pastries and like yeast-raised fried comestibles.
Figure 2:
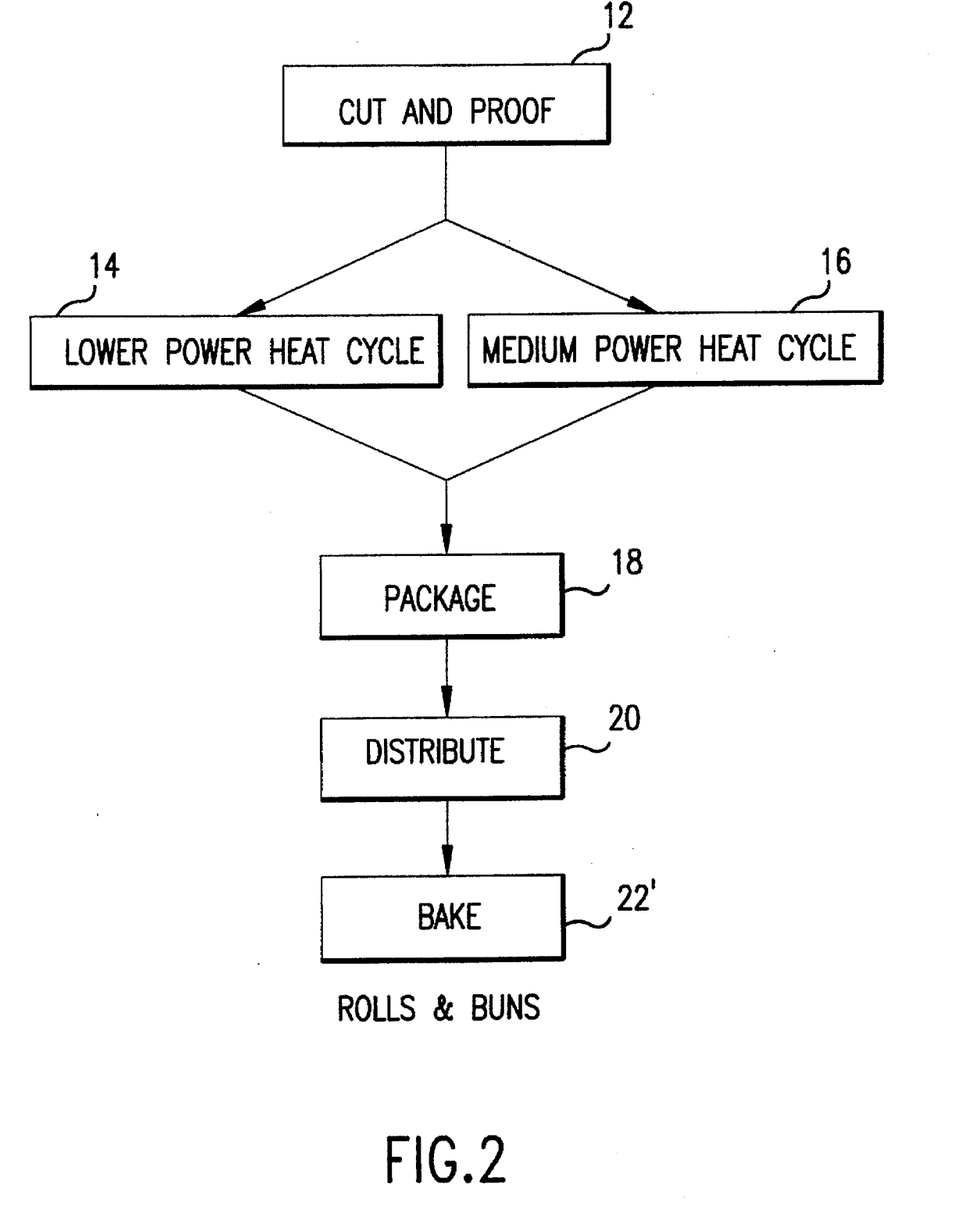
FIG. 2 is a flowchart of the method of the present invention for rolls, buns and like yeast-raised baked comestibles.
Figure 3:
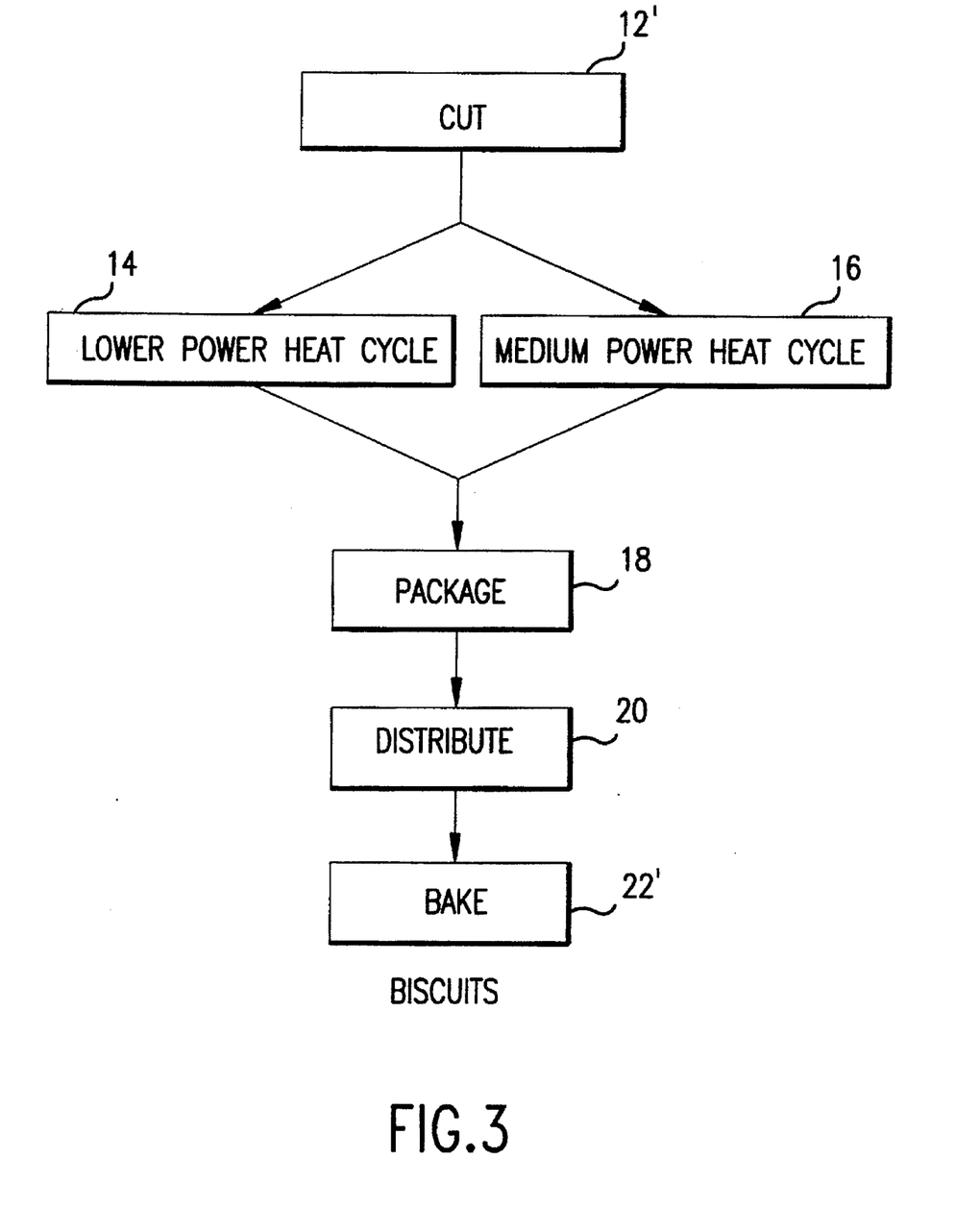
FIG. 3 is a flowchart of the method of the present invention for biscuits and like chemically-leavened baked comestibles.
Figure 4:
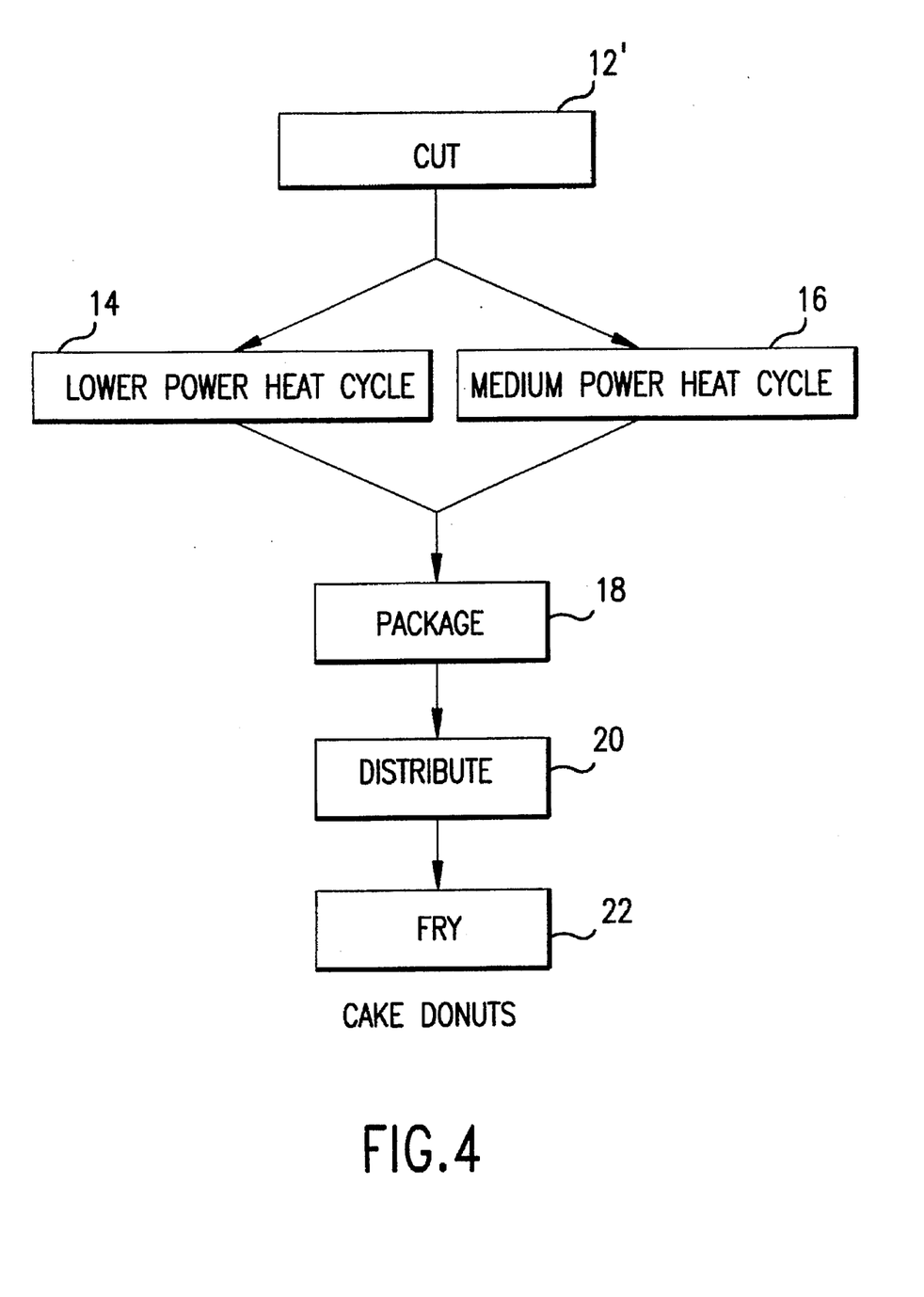
FIG. 4 is a flowchart of the method of the present invention for pastry donuts and like chemically-leavened fried comestibles.
Figure 5:
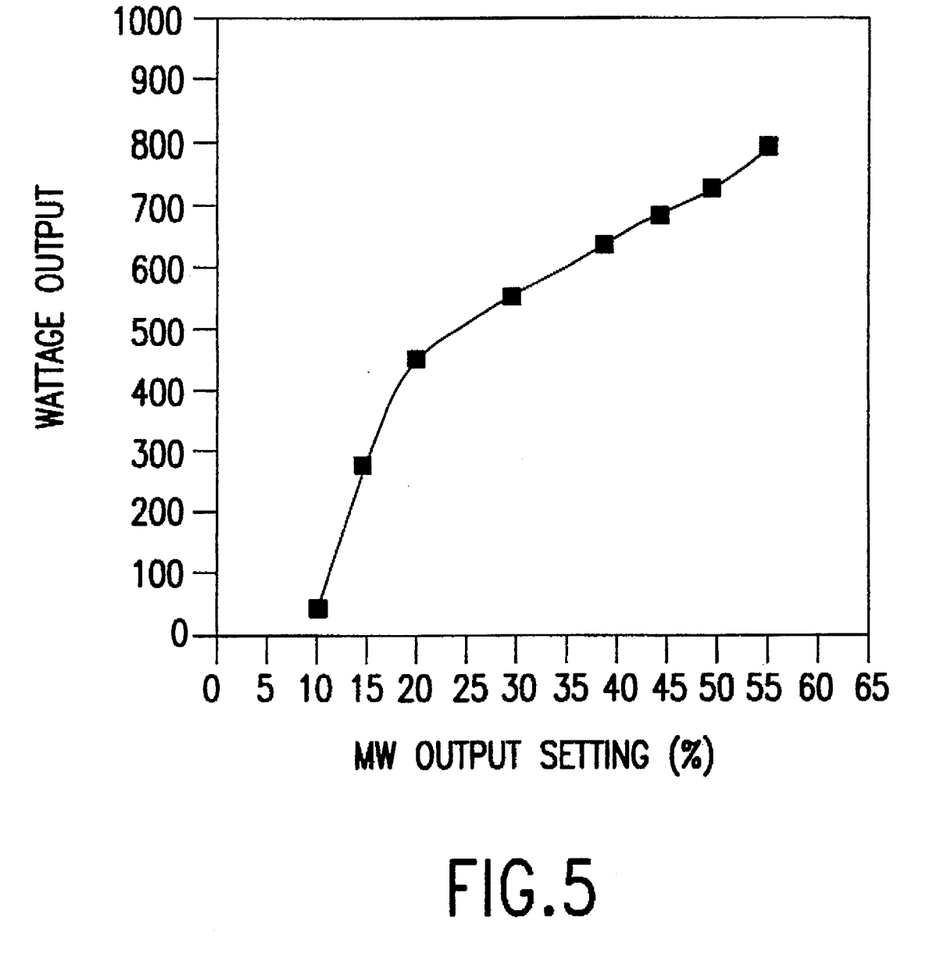
FIG. 5 is a microwave oven calibration curve showing wattage output as a function of microwave percentage output setting.

(1) Weigh out 2000 grams of cold water (10°–15° C.–50°–59° F.) and place it in a glass beaker or polyethylene (PE) container;

(2) Place the water and container in the microwave oven to be calibrated;

(3) Turn on the microwave oven and start heating the water for a certain time (about 7–10 minutes);

(4) Measure the heated water temperature (which should remain less than 50° C. –122° F.) at the end of the time;

(5) Repeat the test;

(6) Calculate the average heat absorbed by the water using the formula:

4.184×(specific heat of water)×(final water temperature–initial water temperature) in ° C.×(water amount, 2000 g/heating time, sec)=power output in watts The data obtained by the calibration procedure is illustrated in FIG. 5. Throughout this specification, only the powers after calibration are specified.

Example 1: Pastry Donut

Using the premix set forth in Table 1 along with other ingredients according to Table 2, the ingredients were mixed in a 12 quart Hobart mixer for about one minute at speed 1, followed by 11 minutes at speed 2. The dough is given 45 minutes of floor time (i.e. fermentation time) at a dough temperature of 80° F. (26° C.). Subsequently, it is divided and cut (using 3 inch—7.62 cm—O.D. and ½ inch—1.27 cm—I.D. cutters) into 1½ ounce (42 grams) pastry donuts and proofed at 100° F. (38° C.) and 50% relative humidity for 35 minutes. Half the pastry donut cuts were stabilized by each of the combination cooking cycles, i.e. half by the low power cycle (simultaneously 350° F.–177° C.—in convection and 37 watts per ounce (per 28 grams) of dough in microwave for a total of 2.5 minutes) and half by the medium power cycle (3 minutes at 350° F.–177° C.—in convection and 96 watts per ounce (per 28 grams) of dough microwave for last 30 seconds of a 3 minute period). Then, the stabilized pastry donuts were packaged in a modified atmosphere package after 15 minutes cooling and stored at room temperature, or frozen in a freezer.

The moisture contents of the pastry donuts made from the intermediate stabilized pastry donuts according to the example and traditional prepared and fried yeast-leavened pastry donuts made according to the same formulas were compared after appropriate frying at 375° F. (191° C.). After the indicated frying times, the moisture contents were determined, with the results indicated in Table 3. The moisture contents for the fried intermediate stabilized pastry donut (whether made by the low or medium heating cycles) were substantially equivalent to the moisture contents of traditional prepared yeast-leavened fried pastry donuts. The fried intermediate stabilized pastry donuts had essentially the same characteristics as traditional prepared and fried yeast-raised pastry donuts.

Example 2: Jelly Donut (Shell)

A dough of the composition specified in Tables 1 and 2 was prepared for jelly pastry donuts as described in Example 1. The dough was divided and cut into 1½ ounce (42 grams) pieces of circular shape by using a 2¾ inch (7 cm) diameter cutter. Then, the cut dough was proofed at 100° F. (38° C.) and 50% relative humidity for a total of 35 minutes. The proofed jelly pastry donut cuts were stabilized by the procedures described in Example 1.

After frying (25 seconds at 375° F.–191° C.—for each side) and cooling down to proper temperature (16°–35° C.–59°–95° F.), a commercially available filling (lemon, strawberry or apple filling) was injected into the fried and cooled jelly pastry donut. The overall characteristics of the filled pastry donut were substantially the same as a traditional jelly pastry donut, i.e. the usual consumer could not distinguish between the two.

Example 3: Long John

A dough of the composition specified in Tables 1 and 2 was prepared for long johns as described in Example 1. The dough was divided and cut into 1½ ounce (42 grams) dough pieces of oblong shape by using a 1½ inch (3.8 cm) width and 5-inch (12.7 cm) long oblong cutter. Then, the cut dough was proofed at 100° F. (38° C.,.) and 50% relative humidity for a total of 35 minutes. The proofed long john dough cuts were stabilized by the procedures described in Example 1.

The frying procedure was as reported in Example 1. The long johns were glazed when hot or decorated with a commercially available icing after cooling down to proper temperature (15°–35° C.–59°–95° F.). The quality of the finished product was substantially equal to that of a conventional long john.

Example 4: Cinnamon Bun

A dough of the composition specified in Tables 1 and 2 was prepared for cinnamon buns as described in Example 1. After a 45 minute rest time at 80° F. (26.7° C.), the dough was sheeted to 3 mm thickness, moistened by spraying water thereon, and then sprinkled with cinnamon powder. Then, the sheeted dough was rolled up (starting at the top and working toward the bottom) to form a long cylinder and was cut into 2 ounce (56 grams) dough pieces with approximately 2¼ to 2½ inch (5.7 to 6.4 cm) diameter. The cinnamon bun dough cuts were then proofed at 100° F. (38° C.) and 50% relative humidity for a total of 35 minutes. The proofed cinnamon bun dough cuts were stabilized by the procedures described in Example 1. The stabilized cinnamon bun dough cuts were fried at 375° F. (191° C.) and 25 seconds for each side. Fried cinnamon buns were glazed when hot or decorated with a commercially available icing after cooling down to proper temperature (15°–35° C.–59°–95° F.). The characteristics of the finished product were substantially the same as those of a conventional cinnamon bun.

Example 5: Dinner Roll

Using the premix set forth in Table 4, along with other ingredients according to Table 5, the dry ingredients were mixed in a 12-quart Hobart mixer for about one minute at speed 1, water was added and mixing continued for about one minute more at speed 1, followed by 11 minutes at speed 2. The dough was given 2½ hours of floor time (i.e. fermentation time) at a dough temperature of 72° F. (22° C.). Subsequently, it was divided and cut into 1½ ounce (42 grams) dinner roll dough pieces and proofed at 100° F. (38° C.) and 50% relative humidity for 35 minutes. The dough cuts were stabilized by a low power cycle in a combined convection oven (350° F.–177° C.) and microwave oven (37 watts per ounce—per 28 grams—of dough) for a total of 2.5 minutes. The cuts were then cooled to ambient temperature and subjected to modified atmosphere packaging, i.e. a conventional mixture of $CO_2$ and $N_2$.

After a period of time to approximate usual storage, distribution and bakery storage time, the intermediate stabilized dinner rolls were cooked by baking in a convection oven at 425° F. (219° C.) for 4 minutes or a conventional (deck) oven at 375° F. (191° C.) for 9 minutes. Compared to traditional Brown-N-Serve dinner rolls (i.e. prebaked rolls, later oven heated), the finished intermediate stabilized dinner rolls had a relatively thin crust and better eating quality.

Example 6: Biscuit

A dough of the composition in Table 7 was prepared for biscuits using the premix set forth in Table 6. The dry ingredients were mixed in a 12-quart Hobart mixer for about one minute at speed 1, shortening was added and mixing continued for about 30 seconds more at speed 1. Buttermilk was then added and mixing continued for about 30 seconds. The dough was immediately sheeted and cut into 2.25 ounce (63 grams) biscuit dough pieces. The dough cuts were stabilized by a low power cycle in a combined convection oven (at 350° F.–177° C.) and microwave oven (at 43 watts per ounce—per 28 grams—of dough) for a total of 2.5 minutes. The cuts were then cooled to ambient temperature and subjected to modified atmosphere packaging, i.e. a conventional mixture of $CO_2$ and $N_2$.

The intermediate stabilized biscuits were finished by baking in a convection oven at 425° F. (219° C.) for 6 minutes. Compared to a commercial pre-packaged biscuit dough (i.e. frozen dough cuts, later oven cooked), the finished intermediate stabilized biscuit had better overall eating quality.

Example 7: Hamburger Bun

A dough of the composition specified in Table 9 was prepared for buns using the premix set forth in Table 8. The dry ingredients were mixed in a 12-quart Hobart mixer for about one minute at speed 1, water and glycerin were added and mixing continued for about one minute more at speed 1, followed by 10 minutes at speed 2. The dough was given 15 minutes of floor time (i.e. fermentation time) at a dough temperature of 80° F. (26.7° C.). Subsequently, it was divided, cut and rolled into 1.80 ounce (50 grams) balls and was given 10 minutes of floor time. After 15 minutes of floor time, the dough balls were sheeted into bun size pieces and proofed at 100° F. (38° C.) and 75% relative humidity for 50 minutes. The dough pieces were stabilized by a low power cycle in a combined convection oven (at 350° F.–177° C.) and microwave oven (at 39 watts per ounce—per 28 grams—of dough) for a total of 3.0 minutes. The dough cuts were then cooled to ambient temperature and subjected to modified atmosphere packaging, i.e. a conventional mixture of $CO_2$ and $N_2$.

The intermediate stabilized buns were finished by baking in a convection oven at 425° F. (219° C.) for 6 minutes. Compared to a traditional prepared bun, the finished intermediate stabilized bun had better overall eating quality.

Example 8: Cake Donut

A dough of the composition specified in Table 11 was prepared for cake donuts using the premix set forth in Table 10. The dry ingredients were mixed in a 12-quart Hobart mixer at speed 1 for one minute. The dry ingredients were removed from the mixing bowl and set aside so that half the water could be placed in the mixing bowl. The dry ingredients and the remaining water were then added to the mixing bowl and mixed for one minute with a paddle at speed 1, followed by 30 seconds mixing at speed 2. The dough was given 5 minutes of floor time at a dough temperature of 80° F. (26.7° C.). Subsequently, it was sheeted and cut into 1.75 ounce (49 grams) donut rings. The donut rings were stabilized by a low power cycle in a combined convection oven (at 350° F.–177° C,) and microwave oven (at 39 watts per ounce—per 28 grams—of dough) for a total of 2.5 minutes. The dough cuts were removed from the oven and cooled to ambient temperature and subjected to modified atmosphere packaging, i.e. a conventional mixture of $CO_2$ and $N_2$.

The intermediate stabilized cake donuts were finished by frying at 375° F. (191° C.) for 25 seconds on each side. Compared to traditional prepared cake donuts, the finished intermediate stabilized cake donut had a similar eating quality.

The intermediate stabilized pastry donuts or a like pastry, when fried to the finished product, has a traditional "fried" color, has a moisture content, eating quality (organoleptic quality) and appearance of a conventional fresh fried pastry donut or like pastry.

Example 9

Intermediate stabilized pastry dough was produced according to Example 1. The dough was inoculated at very high levels (approximately $5\times10^7$/g) with innocuous organisms closely related to pathogens to study the effect of convection and microwave heating procedures of Example 1 to reduce or eliminate microbial activity. The test utilized the organisms *Listeria innocua* and *Staphylococcus aureus*.

After the dough was proofed and shaped according to Example 1, the inoculated organisms were enumerated using standard microbiological methods. This set of samples is labelled below as "Pre-stabilization". Thereafter, the shaped dough was stabilized to the intermediate stabilized dough shapes by the convection and microwave heating procedures of Example 1. Thereafter, again, the inoculated organisms were enumerated using standard microbiological procedures. The results are shown below.

| Inoculated Organisms | Pre-Stabilization[1] | Post-Stabilization[1] |
|---|---|---|
| *Staphylococcus aureus* | $1.6 \times 10^7$ | <10 |
| *Listeria innocua* | $5.3 \times 10^7$ | $4 \times 10^3$ [2] |

[1]Colony forming units per gram of dough.
[2]Counts continued to decrease to <10/g after 14 days of storage.

From the above results, it can be seen that the stabilization process reduces the inoculated bacterial counts dramatically, i.e. immediate a $10^4$ (4-log) reduction for *Listeria innocua* (eventually a 7-log reduction), and $>10^7$ (7-log) reduction for *Staphylococcus aureus*. Generally speaking, in foods, e.g. eggs, a 5-log reduction of pathogenic bacterial is considered to be pasteurized.

A similar test was conducted to study the effect of convection and microwave heating procedures of Example 1 on reducing or eliminating yeast activity used in the leavening process. Yeast counts in the dough after proofing were determined to be $1.4\times10^8$/g, and after processing according to Example 1 were enumerated to be less than 10/g.

These results clearly show that the stabilized dough is such that there is a decrease in the microbial activity of the stabilized dough such that any yeast or potentially pathogenic bacteria present in the dough are substantially reduced or eliminated, and the stabilized dough has a room temperature shelf-life greater than that of a corresponding but unstabilized dough, due to the very low bacterial and yeast counts (about a 5-log reduction) as compared with the unstabilized dough.

From the above, it can be seen that the present stabilized dough shape is substantially different from prior art stabilized bakery products. For example, the present dough shape differs from the microwaveable cookie dough of U.S. Pat. No. 4,911,939 to Lou et al, which utilizes high fructose corn syrup instead of water in a conventional cookie dough to stabilize the dough from microbial activity due to the reduced water activity. The present dough shape is also different from products produced by U.S. Pat. Nos. 5,272, 299; 5,331,135; and 5,334,402 to Ovadia, where dough is cooked in convection/microwave ovens to produce a crusted, ready-to-eat finished product. The cookie dough of Lou et al is not stabilized against moisture loss or changes in shape upon cooking, and the Ovadia products are not dough, but ready-to-eat finished products. The present dough shape is, instead, a dough which can be subsequently freshly cooked to a fresh tasting ready-to-eat finished product, without losing its shape during stabilization or cooking, while retaining the required moisture and exhibiting decreased microbial activity for increased shelf-life. Accordingly, the difficulties of the prior art, as described above, are obviated by the present invention.

Various modifications of the above-described invention will be readily apparent to those skilled in the art. Accordingly, the invention extends to the spirit and scope of the appended claims.

TABLE 1

| Formula of Donut Premix | |
|---|---|
| Ingredients | % Total |
| Flour (cake flour) | 81.94 |

TABLE 1-continued

Formula of Donut Premix

| Ingredients | % Total |
|---|---|
| Dextrose | 6.70 |
| Oil and Emulsifier | 7.50 |
| Salt | 1.45 |
| Leavening Blend | 1.20 |
| Dairy Blend (incl. whey) | 0.87 |
| Vegetable gum blend | 0.25 |
| Color and flavor | 0.09 |
| | 100.00 |

TABLE 2

Formula of Intermediate Stabilized Donut

| Ingredients | % Total |
|---|---|
| Donut premix | 66.84 |
| Instant yeast | 0.93 |
| Water (about 48.1% based on premix weight) | 32.20 |
| Calcium propionate | 0.03 |
| | 100.00 |

TABLE 3

Moisture Contents After Frying

| | Traditional Donut | Intermediate Stabilized Donut |
|---|---|---|
| Moisture Content (%) | 29.08 | 29.29 |
| Frying Time @ 375° F. (191° C.) (seconds per side) | 45 | 20 |

TABLE 4

Formula of Whole Grain Premix

| Ingredients | % Total |
|---|---|
| Flour (all purpose flour) | 70.3 |
| Grain Flakes | 17.1 |
| Oil and Emulsifier | 3.5 |
| Sugar | 3.5 |
| Dairy Blend | 3.2 |
| Salt | 1.7 |
| Dough Conditioner | 0.7 |
| | 100.0 |

TABLE 5

Formula of Intermediate Stabilized Whole Grain

| Ingredients | % Total |
|---|---|
| Whole Grain Premix | 64.15 |
| Instant Yeast | 0.58 |
| Water | 35.27 |
| | 100.00 |

TABLE 6

Formula of Intermediate Stabilized Biscuit Premix

| Ingredients | % Total |
|---|---|
| Flour (all purpose flour) | 93.06 |
| Salt | 2.29 |
| Leavening Blend | 3.67 |
| Sugar | 0.98 |
| | 100.00 |

TABLE 7

Formula of Intermediate Stabilized Biscuit Dough

| Ingredients | % Total |
|---|---|
| Biscuit Premix | 47.52 |
| Shortening | 14.26 |
| Liquid Buttermilk | 38.11 |
| Calcium Propionate | 0.11 |
| | 100.00 |

TABLE 8

Formula of Intermediate Stabilized Bun Premix

| Ingredients | % Total |
|---|---|
| Flour (all purpose flour) | 81.58 |
| Sugar | 6.29 |
| Oil and Emulsifier | 7.63 |
| Salt | 1.21 |
| Dough Conditioners | 0.92 |
| Whey | 2.28 |
| Calcium Propionate | 0.09 |
| | 100.00 |

TABLE 9

Formula of Intermediate Stabilized Bun Dough

| Ingredients | % Total |
|---|---|
| Bun Premix | 64.87 |
| Wheat Gluten | 0.65 |
| Whey | 1.27 |
| Water | 30.60 |
| Instant Yeast | 0.90 |
| Glycerine | 1.59 |
| Calcium Propionate | 0.12 |
| | 100.00 |

TABLE 10

Formula of Cake Donut Premix

| Ingredients | % Total |
|---|---|
| Flour (cake flour) | 68.00 |
| Dextrose | 0.60 |
| Sugar | 16.00 |
| Oil and Emulsifier | 9.50 |

TABLE 10-continued

Formula of Cake Donut Premix

| Ingredients | % Total |
| --- | --- |
| Dairy Blend (incl. whey) | 1.90 |
| Salt | 0.98 |
| Leavening Blend | 2.40 |
| Dough Conditioner | 0.06 |
| Vegetable Gum Blend | 0.15 |
| Color and Flavor | 0.41 |
|  | 100.00 |

TABLE 11

Formula of Intermediate Stabilized Cake Donut Dough

| Ingredients | % Total |
| --- | --- |
| Donut Premix | 70.39 |
| Whey | 1.74 |
| Water | 27.72 |
| Calcium Propionate | 0.15 |
|  | 100.00 |

What is claimed is:

1. A method for making an intermediate, leavened, farinaceous, comestible, stabilized dough having a predetermined shape, which after handling and storage is suitable for subsequent cooking to a ready-to-eat cooked finished product having a predetermined moisture content and shape, comprising:

(1) forming dough into a leavened predetermined finished dough shape; and (2) heating for a predetermined time the dough shape with a combination of convection and microwave heating sufficient to:

(a) stabilize the dough shape such that the subsequent cooking to the finished product does not substantially change the stabilized dough shape;

(b) decrease the microbial activity of the dough such that any yeast present in the dough is deactivated and the stabilized dough has a room temperature shelf-life greater than that of a corresponding but unstabilized dough; and (c) form a substantially continuous exterior surface skin over substantially the entire surface of the stabilized dough shape, said surface skin having gelatinized starch and denatured protein to provide a moisture barrier and a structural integrity sufficient to retain moisture and the dough shape during the heating, handling and storage of the stabilized dough shape that the subsequently cooked finished product has a moisture content and shape substantially equal to the predetermined moisture content and shape.

2. The method of claim 1, wherein the heating is one of simultaneous convection and microwave heating, or convection heating followed by microwave heating, or convection heating following by a combination of convection and microwave heating.

3. The method of claim 2, wherein the convection heating is at about 320° F. to 410° F. (160° C. to 210° C.) and the microwave heating is at a power setting of about 31–82 watts/ounce (per 28 grams) of dough.

4. The method of claim 3, wherein the total heating time is up to 3 minutes.

5. The method of claim 4, wherein the total heating time is at least about 2.5 minutes.

6. The method of claim 2, wherein the convection heating is at about 320° F. to 410° F. (160° C. to 210° C.) and the microwave heating is at a power setting of about 82–111 watts/ounce (per 28 grams) of dough.

7. The method of claim 6, wherein the total heating time is up to 3.0 minutes.

8. The method of claim 2, wherein the heating is simultaneous convection and microwave heating.

9. The method of claim 2, wherein the heating is convection heating followed by microwave heating.

10. The method of claim 2, wherein the heating is convection heating followed by a combination of convection and microwave heating.

11. The method of claim 1, wherein the dough is pastry dough, or dinner roll dough, or hamburger bun dough, or biscuit dough, or cake dough.

12. The method of claim 11, wherein the dough is pastry dough.

13. The method of claim 12, wherein the pastry dough is donut dough.

14. The method of claim 1, wherein the subsequent cooking is by baking or frying or boiling.

15. The method of claim 1, wherein the leavened dough is a yeast-leavened dough.

16. The method of claim 1, wherein the leavened dough is a chemically-leavened dough.

17. An intermediate, leavened, farinaceous, comestible, stabilized dough having a predetermined shape, which after handling and storage is suitable for subsequent cooking to a ready-to-eat finished product having a predetermined moisture content and shape, comprising:

(A) an interior portion having:

(1) a stabilized dough such that the subsequent cooking to the finished product does not substantially change said predetermined shape; and (2) a decreased microbial activity of the dough such that any yeast present in the dough is substantially deactivated and the stabilized dough has a room temperature shelf-life greater than that of a corresponding but unstabilized dough; and (B) a substantially continuous exterior surface skin over substantially the entire surface of the stabilized dough, said surface skin having sufficient gelatinized starch and denatured protein to provide a moisture barrier and a structural integrity sufficient to retain moisture and the dough shape during the heating, handling and storage of the stabilized dough shape that the subsequently cooked finished product has a moisture content and shape substantially equal to the predetermined moisture content and shape.

18. The dough of claim 17, wherein the dough is pastry dough, or dinner roll dough, or hamburger bun dough, or biscuit dough, or cake dough.

19. The dough of claim 18, wherein the stabilized dough is pastry dough.

20. The dough of claim 19, wherein the pastry dough is donut dough.

21. The dough of claim 17, wherein the stabilized dough is in the shape of a dinner roll, or hamburger bun, or biscuit, or cake, or donut.

22. The dough of claim 21, wherein the stabilized dough is in the shape of a donut.

23. The dough of claim 17, wherein the stabilized dough includes a stabilized cell structure.

24. The dough of claim 17, wherein the stabilized dough is packaged in a modified atmosphere.

25. The dough of claim 24, wherein the modified atmosphere is $CO_2$ and $N_2$ or $CO_2$.

26. The dough of claim 17, wherein the stabilized dough has at least 33% by weight of flour.

27. The dough of claim 17, wherein the surface skin has a thickness sufficient to resist pressures generated in the dough during stabilization thereof.

* * * * *